No. 81,551. PATENTED AUG. 25, 1868.
H. B. STEELE.
CAR COUPLING.
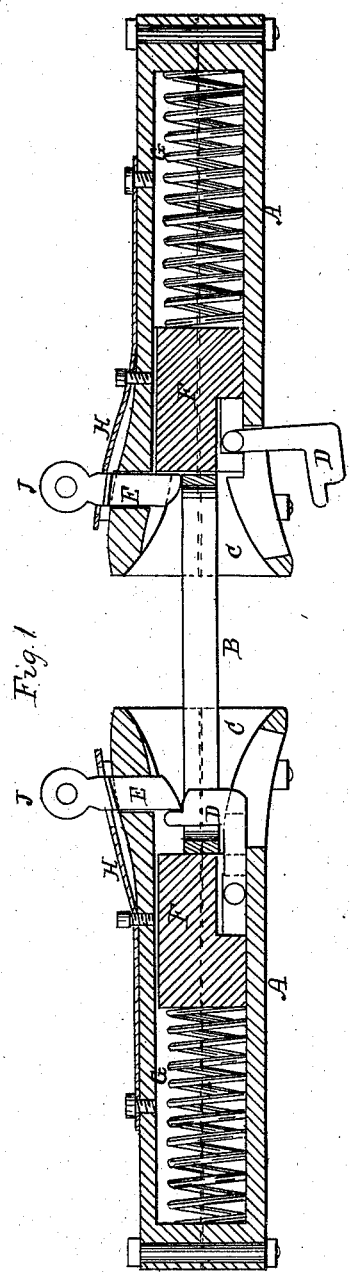
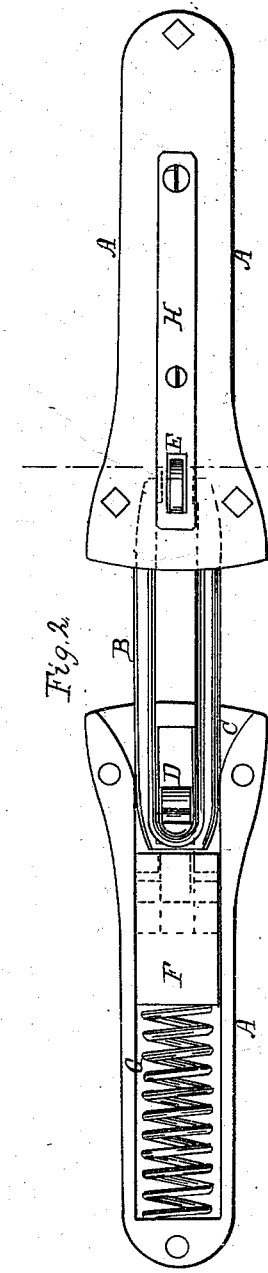
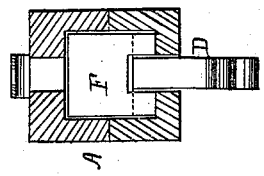
Witnesses.
Inventor
H. P. Steele
by his Atty,
J. F. Reigart.

United States Patent Office.

HARVEY B. STEELE, OF WINSTED, CONNECTICUT.

Letters Patent No. 81,551, dated August 25, 1868.

IMPROVED CAR-COUPLING.

The Schedule referred to in these Letters Patent and making part of the same.

TO ALL WHOM IT MAY CONCERN:

Be it known that I, HARVEY B. STEELE, of Winsted, county of Litchfield, and State of Connecticut, have invented a new and improved Car-Couple or Shackle; and I do hereby declare that the following is a full and exact description thereof, reference being had to the accompanying drawings, and to the letters of reference marked thereon.

The nature of my invention consists in such an arrangement of the parts of a self-acting car-coupling that the shackle or link shall be held in position to enter the draw-head of the car, and become attached thereto.

To enable others skilled in the art to make and use my invention, I will proceed to describe its construction and operation.

I construct my bumper in shape like the ordinary bumper or draw-head, in two parts, bolted together, the cavity within sufficient to contain the apparatus for locking the cars together. A spiral spring is placed in the rear end of the cavity, in front of which is placed a head-block, formed with shoulders, to prevent its being thrown out by the spiral spring. A dog or pin, in two parts, one on the upper, the other on the lower side of the bumper. The lower dog or pin is an eccentric on its back part. When the head-block is moved back, the pin rises, passing through the link, meeting the upper dog or pin, raising it, and passing behind it, when the upper dog is forced down in front of it in that position. The link is made square on each end, and held in its place by the head-blocks being forced against it by the spiral spring in the rear of said head-block, thus completing the couple and holding it in that position. A small spring is attached to the top of the bumper or shackle to regulate the upper dog or pin. The car is uncoupled by putting a ring on the top of the shackle or bumper attached to the upper dog or pin. A cord may be attached to this ring, convenient for the conductor on the platform, by which he can uncouple the cars at pleasure. This couple will connect with any of the ordinary shackles or bumpers now in use if conducted into it by hand, and the danger of coupling in the ordinary way is avoided by the use of this coupling.

Figure 1 represents a longitudinal sectional view of the coupling, showing one coupling with the link locked and the other open.

Figure 2 represents a top view of the same, with one coupling open, showing the coupling-link in its place, with the head-block forced back against the spiral spring.

Figure 3 shows a front view of the draw-head and lower dog.

A represents the frame or bumper containing the coupling-devices. B is the coupling-link, which is square on each end. C is the flaring jaws of the bumper, and as the coupling-link is entered, it forces back the head-block F. As the head-block is forced back, the dog D is raised and passes up through the coupling-link and past the dog E. As soon as the dog D has passed the dog E, the dog E drops into the offset in the upper part of the dog D, and securely holds the coupling-link in its place, which become a complete lock for the link. G is a spiral spring in the rear of the head-block F, which forces the block forward, and holds the coupling-link in a horizontal position, which allows the cars to be readily and safely coupled without endangering the lives of those engaged in the operation.

H is a spring upon the top of each coupling, and through which the dog E passes. The object of this spring is to keep the dog E in its proper place after the coupling-link has entered. J is a ring in the top of the dog E, to which a chain may be attached, for the purpose of uncoupling the cars.

The cars are easily and safely uncoupled by raising the dog E, which liberates the dog D, when the link is at once thrown out by the spiral spring G forcing forward the head-block F.

What I claim as my invention, and desire to secure by Letters Patent, is—

The construction of the bumper A with its spiral spring G, head-block F with its dog D, and the dog E with its spring H, all arranged, combined, and operating the square-end link B, as herein described and for the purpose set forth.

HARVEY B. STEELE.

Witnesses:
E. D. MAYHEW,
F. W. FARLEY.